United States Patent
Uegane et al.

(10) Patent No.: US 6,378,645 B1
(45) Date of Patent: Apr. 30, 2002

(54) EXHAUST PIPE LAYOUT STRUCTURE FOR VEHICLES

(75) Inventors: Masayuki Uegane; Kenji Kozaki; Hidenori Suzuki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/580,628

(22) Filed: May 30, 2000

(30) Foreign Application Priority Data

Jun. 1, 1999 (JP) .......................................... 11-153393

(51) Int. Cl.[7] .............................................. B60K 13/04
(52) U.S. Cl. ....................... 180/309; 180/296; 180/89.2
(58) Field of Search ............................... 180/89.2, 296, 180/309; 60/320, 324; 285/226

(56) References Cited

U.S. PATENT DOCUMENTS 5,127,489 A * 7/1992 Takato et al. ............... 180/309
5,195,607 A * 3/1993 Shimada et al. ............ 180/296
6,105,708 A * 8/2000 Amano et al. .............. 180/309

FOREIGN PATENT DOCUMENTS

| JP | 2-293269 A | * 12/1990 |
| JP | 2-293271 A | * 12/1990 |
| JP | 5-1530 | 1/1993 |

* cited by examiner

Primary Examiner—J. J. Swann
Assistant Examiner—J. Allen Shriver, II
(74) Attorney, Agent, or Firm—Armstrong, Westerman & Hattori, LLP

(57) ABSTRACT

An exhaust pipe layout structure for vehicles comprises a first exhaust pipe extending from an exhaust manifold coupled to a rear side of a cylinder head of an engine toward the rear of a vehicle body, a second exhaust pipe and a catalyzer which are connected to each other with two flexible joints. A first inclined portion inclines toward the rear in a downward direction and a second inclined portion inclines toward the rear in an upward direction are provided in front of and behind a lowest point of the first and second exhaust pipes, respectively, and a drive shaft for a front wheel and a steering gear box for the front wheels are disposed in front of and behind the first inclined portion, respectively.

9 Claims, 7 Drawing Sheets

EXHAUST PIPE LAYOUT STRUCTURE FOR VEHICLES

BACKGROUND OF THE INVENTION

1. Field of the Invention

The present invention relates to an exhaust pipe layout structure for vehicles in which an engine having a cylinder head disposed on an upper side thereof and a transmission coupled to the engine are transversely mounted at a front portion of a vehicle body and in which an exhaust pipe extends from an exhaust manifold coupled to a rear side of the cylinder head extends toward the rear of the vehicle body.

2. Description of the Related Art

An exhaust pipe layout structure as described above is known in Japanese Patent Unexamined Publication No. Hei. 5-1530 (JP-A-5-1530). In this conventional exhaust pipe layout structure, a power unit is transversely mounted which comprises an engine and a transmission which are made integral with the engine being disposed such that the crankshaft is oriented in a transverse direction of the vehicle body and that the axes of the cylinders are inclined rearward. In addition, an exhaust pipe having an inclined portion extending toward the rear in a downward direction and a horizontal portion extending to the rear is connected to a rear end of an exhaust manifold coupled to a rear side of a cylinder head of the engine, and a catalyzer is connected to a rear end of the exhaust pipe. The exhaust pipe is connected to the exhaust manifold and the catalyzer via flexible joints at the front and rear ends thereof, respectively. The vibration of the exhaust pipe is designed to be controlled by disposing the roll center of the power unit and the two flexible joints in a specific positional relationship.

In a front-wheel-drive vehicle in which the power unit is transversely mounted, the drive shafts for driving the left and right front wheels extend in transverse directions of the vehicle body from a rear portion of the transmission, and the steering gear box for steering the front wheels is disposed behind the drive shafts in such a manner as to be oriented in a transverse direction of the vehicle body. In this construction, when the exhaust pipe extending from the exhaust manifold coupled to the rear side of the cylinder head is tried to be led downwardly below the floor panel, since the exhaust pipe comes to interfere with the drive shafts and the steering gear box, it is difficult to provide a compact layout.

In addition, since the exhaust pipe is constructed so as to pass behind the power unit, there is a possibility that the impact absorption effect is reduced unless the exhaust pipe easily buckles when the vehicle crashes.

SUMMARY OF THE INVENTION

The present invention has been made in view of the above circumstances, and objects thereof are to provide a compact layout for an exhaust pipe of vehicles in which an exhaust pipe extends from a rear side of a transversely mounted power unit toward the rear of a vehicle body of the vehicle, wherein the exhaust pipe is laid out in such a manner as not to interfere with drive shafts for front wheels and a steering gear box and to provide a layout for an exhaust pipe wherein an exhaust pipe is laid out in such a manner as not to interrupt the impact absorption effect when the vehicle crashes.

DETAILED DESCRIPTION OF THE PREFERRED EMBODIMENT

Figure 1:
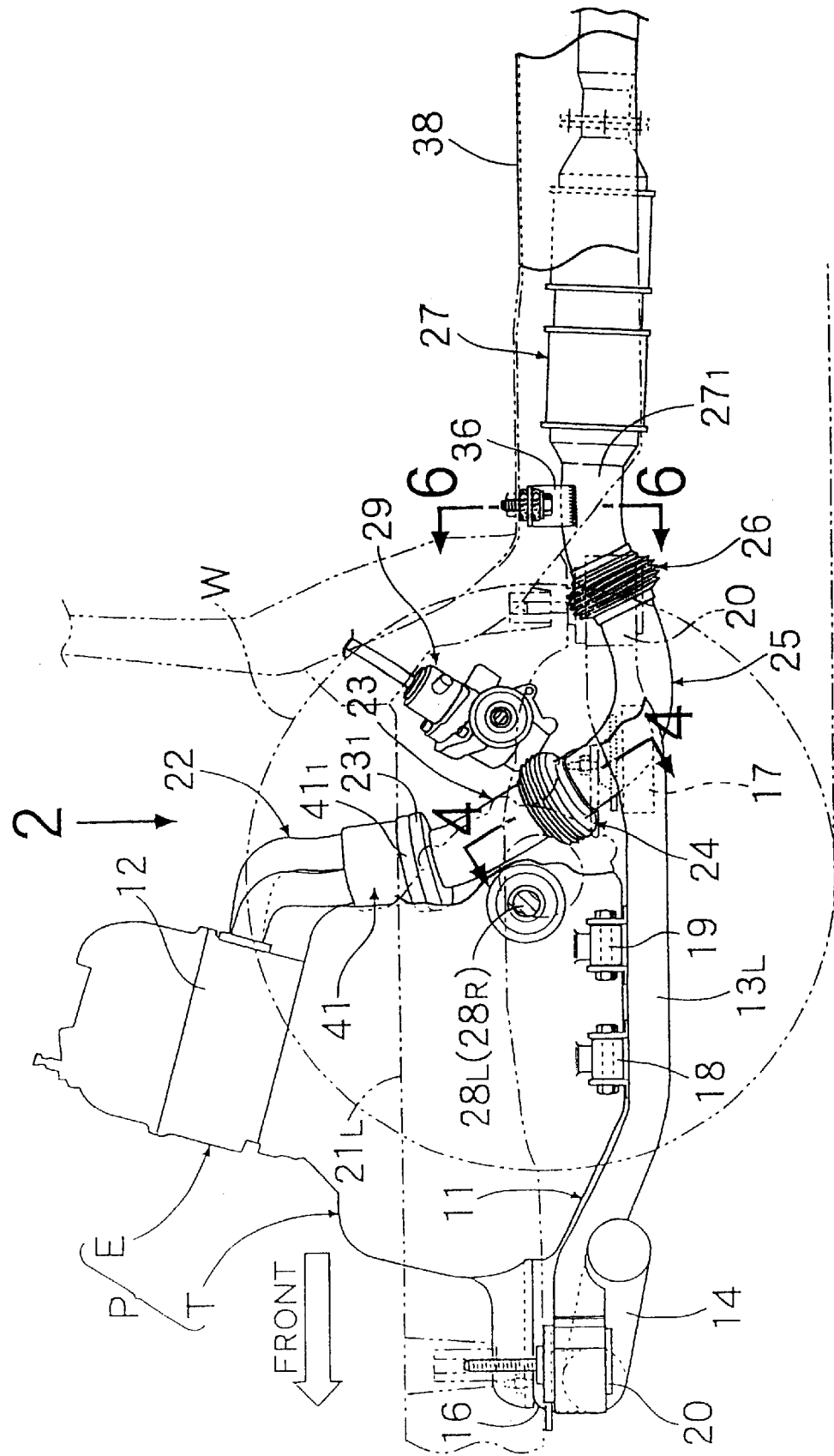
FIG. 1 is a side view of a front portion of a vehicle body of a front-wheel-driven vehicle.

With a view to attaining the above objects, according to a first feature of the invention, there is provided an exhaust pipe layout structure for vehicles in which an engine having a cylinder head disposed on an upper side thereof and a transmission coupled to the engine are transversely mounted at a front portion of a vehicle body and in which the exhaust pipe extends from an exhaust manifold coupled to a rear side of the cylinder head extends toward the rear of the vehicle body, characterized in that the exhaust pipe has an inclined portion extending from the exhaust manifold toward the rear in a downward direction, in that a drive shaft for a front wheel extending transversely from the transmission is disposed in front of the inclined portion and in that a steering gear box is disposed behind the inclined portion.

According to the above construction, since the inclined portion extending from the exhaust manifold is formed on the exhaust pipe of the engine in which exhaust gas is discharged rearward and since the front wheel drive shaft and front wheel steering gear box are disposed in front of and behind this inclined portion, respectively, the drive shaft, exhaust pipe and steering gear box can be rationally disposed behind the engine to save and reduce a space required therefor, while maintaining an appropriate position of the steering gear box relative to the front wheels.

In addition, according to a second feature of the invention, there is provided, in addition to the structure as set forth in the first feature, an exhaust pipe layout structure for vehicles, wherein a pre-catalyzer disposed at a connecting portion between the exhaust manifold and the exhaust pipe and the steering gear box are offset vertically.

According to the above construction, when the pre-catalyzer is moved backward together with the engine and the exhaust manifold when the vehicle crashes, since the mutual interference between the pre-catalyzer and the steering gear box is prevented which are offset vertically, this serves to improve the impact absorption effect at the time of collision.

Furthermore, according to a third feature of the invention, there is provided an exhaust pipe layout structure for vehicles in which an engine having a cylinder head disposed on an upper side thereof and a transmission coupled to the engine are transversely mounted at a front portion of a vehicle body and in which the exhaust pipe extends from an exhaust manifold coupled to a rear side of the cylinder head toward the rear of the vehicle body, characterized in that the exhaust pipe has a first inclined portion extending from the exhaust manifold toward the rear in a downward direction and a second inclined portion extending from a lowest point at a rear end of the first inclined portion toward the rear in an upward direction, and in that a pair of flexible joints adapted to permit the deflection of the exhaust pipe are disposed, respectively, at the first inclined portion and the second inclined portion which are disposed in front of and behind the lowest point, respectively.

According the above construction, since the exhaust pipe comprises the first inclined portion extending from the exhaust manifold toward the rear in the downward direction and the second inclined portion extending from the lowest point at the rear end of the first inclined portion toward the rear in the upward direction, and since there are provided the flexible joints at the first inclined portion and the second inclined portion, respectively, not only can the deflection of the exhaust pipe entailed by the rolling of the engine be absorbed but also the impact absorption effect can be improved by allowing the exhaust pipe to be bent into a V-shape at the lowest point by virtue of a load applied from the front of the vehicle when it crashes.

A first exhaust pipe 23 and a second exhaust pipe 25 in an embodiment correspond to the exhaust pipe of the invention, a fist flexible joint 24 and a second flexible joint 26 of the embodiment correspond to the flexible joints of the invention, a floor panel 38 of the embodiment corresponds to the vehicle body of the invention, and a first inclined portion Si corresponds to the inclined portion of the invention.

A mode for carrying out the invention will be described based on an embodiment of the invention illustrated in the accompanying drawings.

Figure 2:
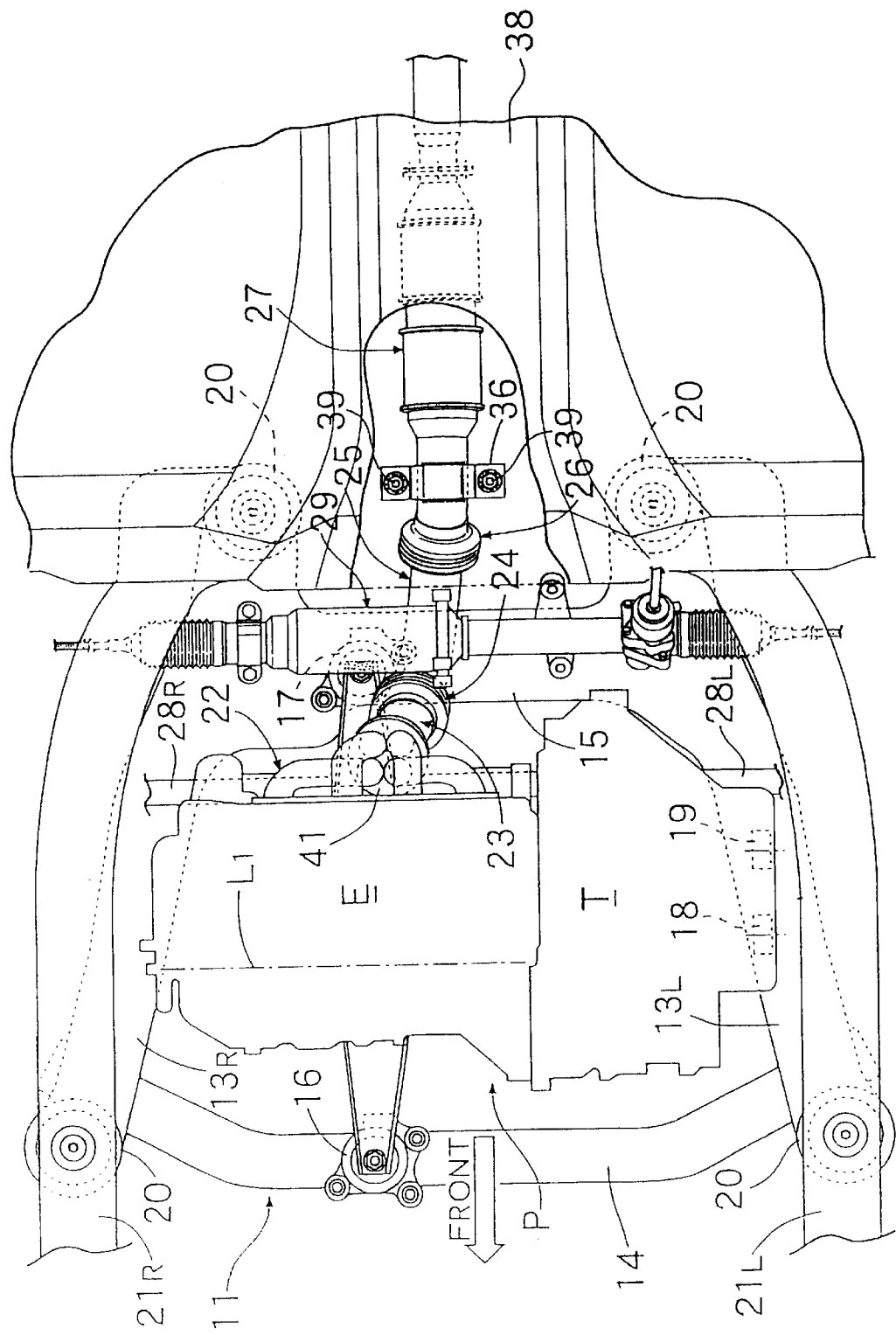
FIG. 2 is a partial view taken in the direction of the arrow 2 of FIG. 1.
Figure 3:
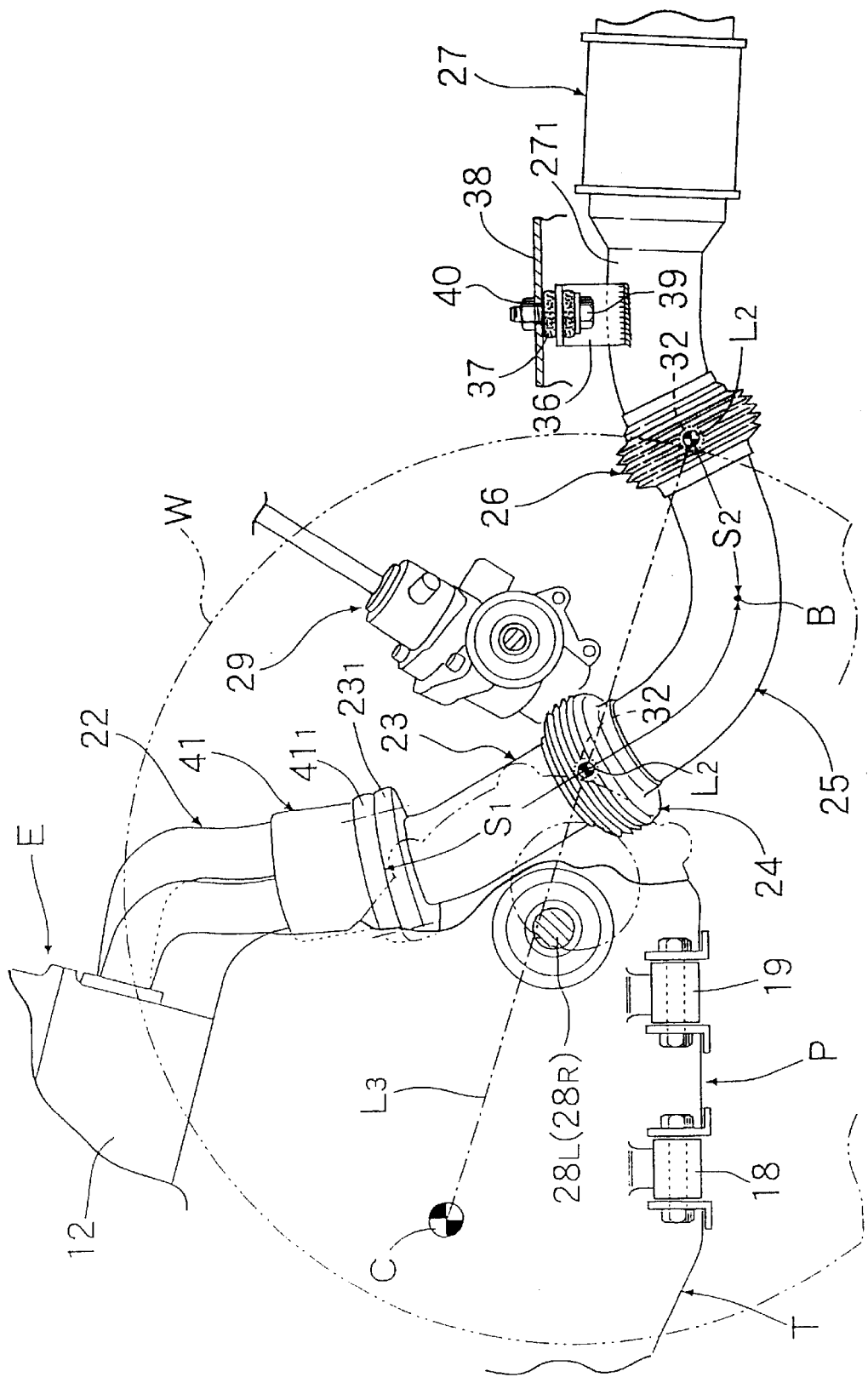
FIG. 3 is a partial enlarged view according to FIG. 1.
Figure 4:
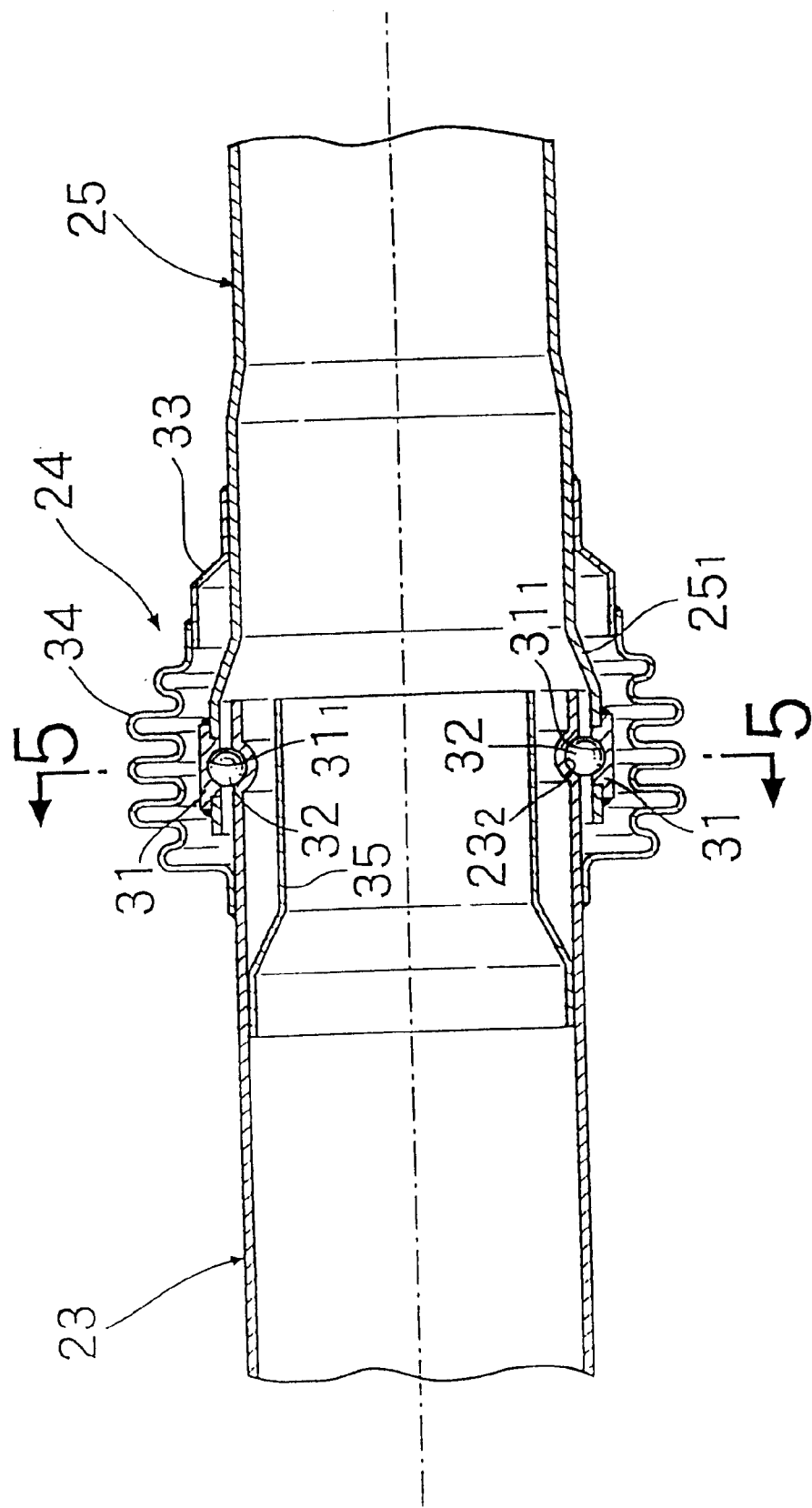
FIG. 4 is an enlarged sectional view taken along the line 4—4 of FIG. 1.
Figure 5:
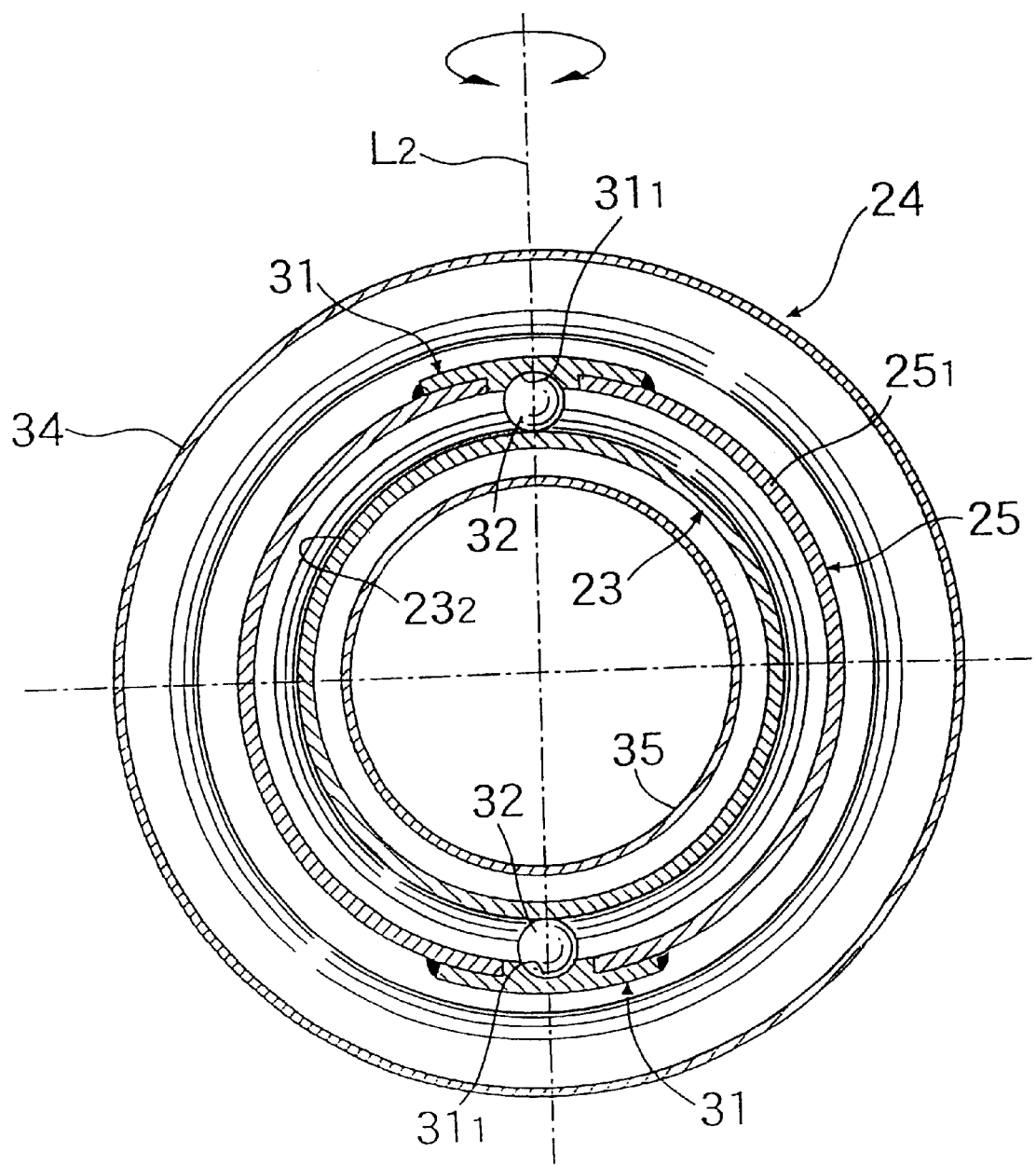
FIG. 5 is an enlarged sectional view taken along the line 5—5 of FIG. 4.
Figure 6:
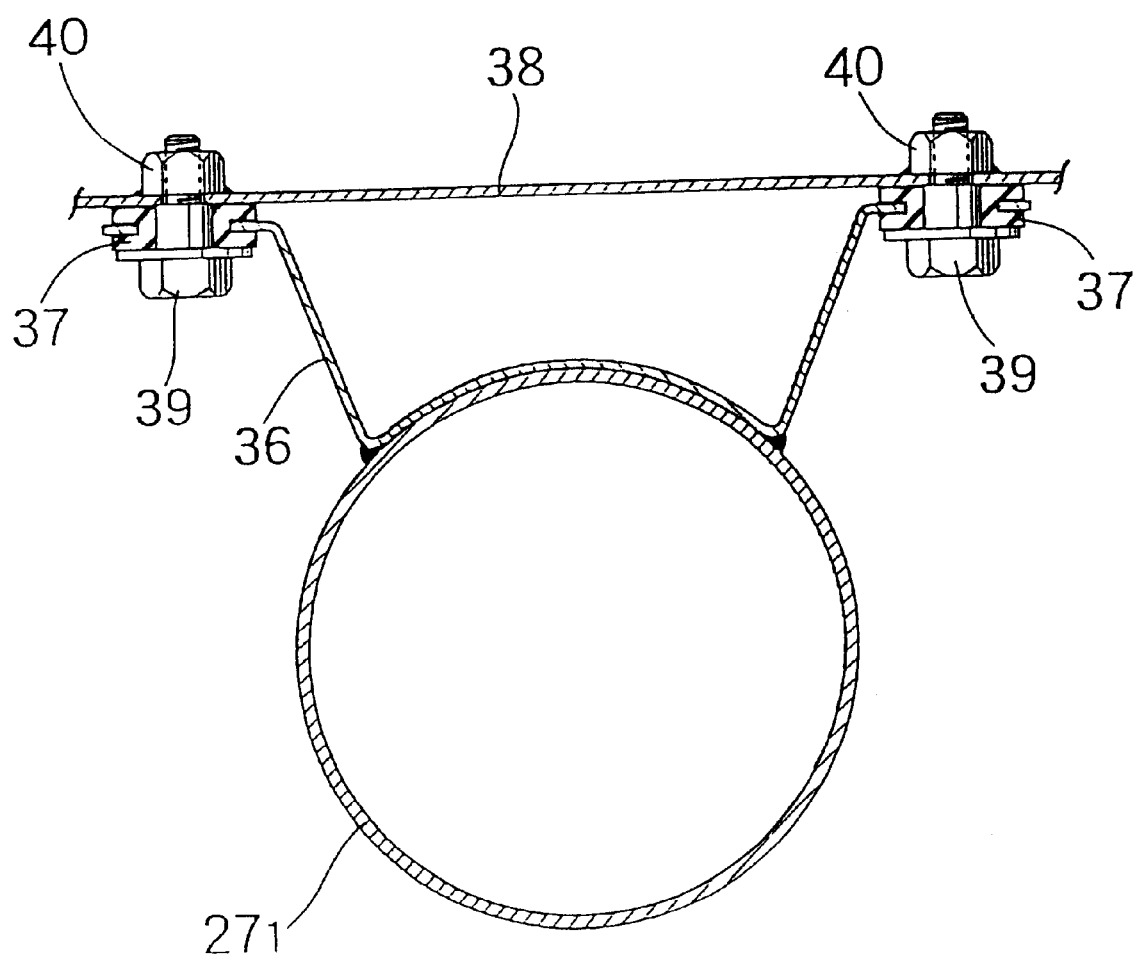
FIG. 6 is an enlarged sectional view taken along the line 6—6 of FIG. 1.
Figure 7:
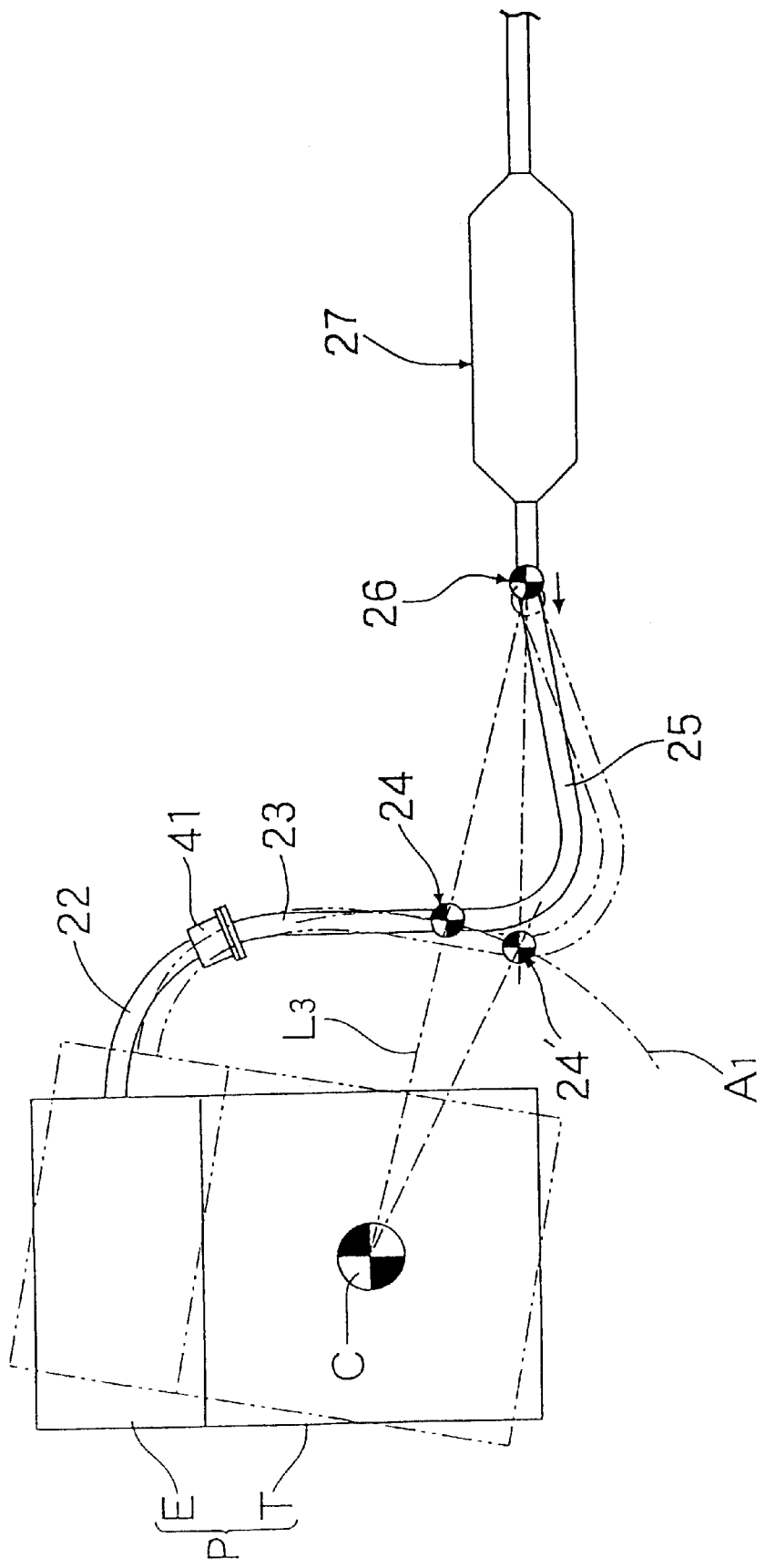
FIG. 7 is a partial cutaway view illustrating an operation of the present invention.

FIGS. 1 to 7 show one embodiment of the invention, in which FIG. 1 is a side view of a front portion of a vehicle body of a front-wheel-drive vehicle, FIG. 2 is a view seen in a direction indicated by an arrow 2 of FIG. 1, FIG. 3 is an enlarged view showing a main portion of FIG. 1, FIG. 4 is an enlarged sectional view taken along the line 4—4 of FIG. 1, FIG. 5 is an enlarged sectional view taken along the line 5—5 of FIG. 4, FIG. 6 is an enlarged sectional view taken along the line 6—6 of FIG. 6, and FIG. 7 is a view explaining an operation of the invention.

As shown in FIGS. 1 and 2, a power unit P comprising an in-line four-cylinder engine E disposed on the front right-hand side of a vehicle body and a transmission T disposed on the front left-hand side thereof which are made integral are transversely mounted on a front sub-frame 11 formed into a quadrilateral frame-like shape with the axis L1 of a crankshaft being oriented in a transverse direction of the vehicle body and a cylinder head 12 being disposed on the upper side of the engine. The front sub-frame 11 comprises left and right side members 13L, 13R, a front member 14 and a rear member 15. A front portion of the engine E is supported on the front member 14 via front mounts 16, and a rear portion of the engine E is supported on the rear member 15 via rear mounts 17. A left end portion of the transmission T is supported on the left side member 13L via a pair of side mounts 18, 19. The sub-frame 11 on which the power unit P is mounted is supported on lower surfaces of left and right main frames 21L, 21R extending in a longitudinal direction of the vehicle body via sub-frame mounts 20 . . . provided at four corners of the sub-frame 11.

As shown in FIG. 3, an exhaust manifold 22 curved downwardly is coupled to a rear side of the cylinder head 12 of the engine E, and a coupling flange $23_1$ of a first exhaust pipe 23 is coupled to a coupling flange $41_1$ of a pre-catalyzer 41 provided at a downstream end of the exhaust manifold 22, an upstream end of a second exhaust pipe 25 is coupled to a downstream end of this first exhaust pipe 23 via a first flexible joint 24, and an exhaust gas introduction pipe $27_1$ of a catalyzer 27 is coupled to a downstream end of this second exhaust pipe 25 via a second flexible joint 26. The first exhaust pipe 23 is formed linearly and is disposed so as to incline toward the rear in a downward direction from a front upper end thereof. The second exhaust pipe 25 is curved into an arc-like shape having a central angle of about 120 degrees, and upstream and downstream ends of the second exhaust pipe 25 both incline upwardly. In other words, the second exhaust pipe 25 is disposed downwardly convexly such that a central portion thereof becomes a lowest point B.

Thus, defined as a first inclined portion S1 is a portion ranging from the upstream end of the first exhaust pipe 23 to the lowest point B of the second exhaust pipe 25, in other words, the fist exhaust pipe 23 and a portion of the second exhaust pipe 25 which inclines toward the rear in the downward direction, while a portion ranging from the lowest point B to the downstream end of the second exhaust pipe 25 or a portion of the second exhaust pipe 25 which inclines toward the rear in an upward direction is defined as a second inclined portion S2.

Left and right drive shafts 28L, 28R extend from the transmission T in transverse directions of the vehicle body, and distal ends of these drive shafts 28L, 28R are connected to left and right front wheels, respectively. The drive shaft 28R extending rightward from the transmission T is disposed directly in front of the first exhaust pipe 23 and a steering gear box 29 for steering the left and right front wheels W, W is disposed directly behind the first exhaust pipe 23 at a height as substantially high as the right drive shaft 28R. To be more specific, the right drive shaft 28R is situated more forward than the first flexible joint 24, and the steering gear box 29 is situated more rearward than the first flexible joint 24 but more forward than the second flexible joint 26. In addition, the pre-catalyzer 41 is disposed so as to be offset to a higher position relative to the steering gear box 29 which is situated 32, 32 acting as a fulcrum.

In FIG. 3, the axes L2 of the first flexible joint 24 and the second flexible joint 26 are disposed in a direction perpendicular to the surface of the paper illustrating FIG. 3 thereof. Therefore, the first exhaust pipe 23 and the second exhaust pipe 25 jointed to each other by the first flexible joint 24 can be oscillated relatively within a plane along the surface of the paper of FIG. 3. The roll center C of the power unit P, the axis L2 of the first flexible joint 24 and the axis L2 of the second flexible joint 26 are located on the same straight line L3 when viewed from the side. The roll center C is an axis acting as the center of rolling when the power unit P rolls by virtue of the inertia force resulting from the acceleration or deceleration of the engine E.

As shown in FIGS. 3 and 6, a mounting bracket 36 is welded to the exhaust gas introduction pipe $27_1$ of the catalyzer 27, and rubber bushes 37, 37 are fitted on ends of this mounting bracket 36. Stepped bolts 39, 39 penetrating through the rubber bushes 37, 37 and a floor panel 38 are tightened by nuts 40, 40, whereby the exhaust gas introduction pipe $27_1$ of the catalyzer 27 is fixed in such a manner as to extend along a lower surface of the floor panel 38.

Thus, as shown in FIG. 7, when the engine E is accelerated or decelerated, causing the power unit P to roll about the roll center C rearward from a position indicated by solid lines to a position indicated by chain lines, the position of the roll center C is not changed, and the position of the second flexible joint 26 provided on the catalyzer 27 fixed to the floor panel behind the pre-catalyzer 41.

Next, referring to FIGS. 4 and 5, the construction of the first flexible joint 24 will be described. The construction of the second flexible joint 26 is substantially identical to that of the first flexible joint 24, and therefore the description thereof will be omitted in order to avoid a repeated description.

The first flexible joint 24 for providing a flexible joint between the first exhaust pipe 23 and the second exhaust pipe 25 by fitting an inner peripheral surface of the upstream end of the second exhaust pipe 25 over an outer peripheral surface of the downstream end of the first exhaust pipe 23 comprises an annular groove $23_2$ formed in the outer peripheral surface of the first exhaust pipe 23, a pair of ball holders 31, 31 welded to diametrical ends of an enlarged diameter portion $25_1$ of the second exhaust pipe 25, a pair of balls 32, 32 adapted to fit in depressed portions $31_1$, $31_1$ formed in the pair of ball holders 31, 31 and the annular groove $23_2$, a flexible bellows pipe 34 welded to the outer peripheral surface of the first exhaust pipe 23 at one end thereof and to an outer peripheral surface of the second exhaust pipe 25 via a spacer 33 at the other end thereof, and a rectifier tube 35 welded to an inner peripheral surface of the first exhaust pipe 23 so as to cover a joint portion between both the exhaust pipes 23, 25.

The first flexible joint 24 has an axis L2 (refer to FIG. 5) passing through the centers of the pair of balls 32, 32, and the oscillation of the first exhaust pipe 23 and the second exhaust pipe 25 is permitted around the axis L2 with these balls 38 is finely deflected forward by virtue of the elastic deformation of the rubber bushes 37, 37. Therefore, the first flexible joint 24 situated between the roll center and the second flexible joint 26 deflects from the initial position to a lower position indicated by reference numeral 24'. When this happens, a change in angle between the first exhaust pipe 23 and the second exhaust pipe 25 is absorbed by the first flexible joint 24, and a change in angle between the second exhaust pipe 25 and the catalyzer 27 is absorbed by the second flexible joint 26.

In addition, assuming that the power unit P, the exhaust manifold 22 and the first exhaust pipe 23 are a rigid body, since the first flexible joint 24 moves on an arc A1 which centers on the roll center C when the power unit P rolls, the second flexible joint 26 is slightly moved forward by virtue of the elastic deformation of the rubber bushes 37, 37, and the second exhaust pipe 25 follows the movement of the first exhaust pipe 23.

Since the roll center C, the first flexible joint 24 and the second flexible joint 26 are situated on the same straight line L3 in a neutral state, the forward movement of the second flexible joint 26 is suppressed to a minimum level when the first flexible joint 24 moves on the arc A1. As a result of this, bending stresses generated on the exhaust manifold 22, the first exhaust pipe 23 and the second exhaust pipe 25 when the power unit P rolls are suppressed to a minimum level, and deflected loads applied to the first flexible joint 24 and the second flexible joint 26 can be suppressed to a minimum level. Moreover, the interruption of the rolling of the power unit P by the exhaust system is prevented, thereby making it possible to improve the vibration absorption properties.

Thus, the case has been described where the power unit P rolls rearward about the roll center C, whereby the first flexible joint 24 is deflected downwardly to the position 24', but the same effect can be provided even when the power unit P rolls forward about the roll center C, whereby the first flexible joint 24 is deflected upwardly.

As is clear from FIG. 3, the first inclined portion S1 which inclines toward the rear in the downward direction is held between the first exhaust pipe 23 and the second exhaust pipe 25, and the right drive shaft 28R is disposed in front of the first inclined portion S1, while the steering gear box 29 is disposed behind the same, whereby the right drive shaft 28R, the first exhaust pipe 23, the second exhaust pipe 25 and the steering gear box 29 can be laid out compactly in a narrow space behind the power unit P. The steering gear box 29 is connected to the front wheels W, W via tie rods, and therefore its position cannot be moved forward limitlessly. Thus, when trying to dispose the first inclined portion S1 behind the steering gear box 29, a large longitudinal space is required behind the power unit P.

In addition, when the power unit P is moved backward by the frontal collision of the vehicle, since the exhaust gas introduction pipe $27_1$ of the catalyzer 27 is fixed to the floor panel 38, a compression load is applied to the exhaust manifold 22, the first exhaust pipe 23 and the second exhaust pipe 25. Since the first exhaust pipe 23 and the second exhaust pipe 25 have the first inclined portion Si in front of the lowest point B and the second inclined portion S2 behind the lowest point B and are curved downwardly convexly as a whole, the first exhaust pipe 23 and the second exhaust pipe 25 are easily bent into a V-shape at the lowest point B by virtue of the compression load, whereby the impact absorption effect can be improved. In this case, the first exhaust pipe 23 and the second exhaust pipe 25 are relatively bent at the first flexible joint 24, and the second exhaust pipe 25 and the catalyzer 27 are relatively bent at the second flexible joint 26, whereby the impact absorption effect can further be improved.

Furthermore, when the power unit P is moved backward by the frontal collision of the vehicle, since the pre-catalyzer 41 which is moved backward together with the power unit P is offset upwardly relative to the steering gear box 29, the interference of the pre-catalyzer 41 with the steering gear box 29 is prevented, whereby the impact absorption effect at the time of collision can be improved.

Moreover, since the first flexible joint 24 and the second flexible joint 26 are disposed at positions higher than the lowest point B of the second exhaust pipe 25, there is eliminated a risk that the first flexible joint 24 and the second flexible joint 26 are brought into direct contact with a surface of a irregular road even when the vehicle is driven on such the irregular road, whereby the first flexible joint 24 and the second flexible joint 26 are prevented from being damaged.

Thus, while the specific embodiment of the invention has been described heretofore, the invention may be modified in design in various ways without departing from the substance of the disclosure thereof. Of course, a structure for a left-steering vehicle can have arrangements as well as operation and advantages which are basically similar to those of the embodiment of the present invention.

Thus, according to the first feature of the invention, since the inclined portion extending from the exhaust manifold toward the rear in the downward direction is formed on the exhaust pipe of the engine in which exhaust gas is discharged rearward and since the front wheel drive shaft and front wheel steering gear box are disposed in front of and behind this inclined portion, respectively, the drive shaft, exhaust pipe and steering gear box can be rationally disposed behind the engine to save and reduce a space required therefor, while maintaining an appropriate position of the steering gear box relative to the front wheels.

In addition, according to the second feature of the invention, when the pre-catalyzer is moved backward together with the engine and the exhaust manifold when the vehicle crashes, since the mutual interference between the pre-catalyzer and the steering gear box is prevented which are offset vertically, this serves to improve the impact absorption effect at the time of collision.

Furthermore, according to the third feature of the invention, since the exhaust pipe comprises the first inclined portion extending from the exhaust manifold toward the rear in the downward direction and the second inclined portion extending from the lowest point at the rear end of the first inclined portion toward the rear in the upward direction, and since there are provided the flexible joints at the first inclined portion and the second inclined portion, respectively, not only can the deflection of the exhaust pipe entailed by the rolling of the engine be absorbed but also the impact absorption effect can be improved by allowing the exhaust pipe to be bent into a V-shape at the lowest point by virtue of a load applied from the front of the vehicle when it crashes.

What is claimed is:

1. An exhaust pipe layout structure for a vehicle, comprising:

an engine;

a cylinder head disposed on said engine;

a transmission coupled to said engine, said engine and said transmission being transversely mounted at a front portion of a vehicle body;

an exhaust manifold coupled to a rear side of said cylinder head;

an exhaust pipe including a first inclined portion extending downward from said exhaust manifold toward the rear and a second inclined portion extending upward from a lowest point at a rear end of said first inclined portion toward the rear; and a pair of flexible joints being a first flexible joint disposed in said first inclined portion and a second flexible joint disposed in said second inclined portion.

2. The exhaust pipe layout structure according to claim 1, wherein a roll center of a power unit, said first flexible joint and said second flexible joint are situated on the same straight line in a neutral state.

3. The exhaust pipe layout structure according to claim 1, wherein said exhaust pipe is curved in an arc-like shape having a central angle of approximately 120 degrees.

4. The exhaust pipe layout structure according to claim 1, wherein said first flexible joint and said second flexible joint are respectively disposed at positions higher than said lowest point of said exhaust pipe.

5. The exhaust pipe layout structure according to claim 1, further comprising:

a drive shaft disposed in front of said first inclined portion; and a steering gear box disposed behind said first inclined portion.

6. A vehicle, comprising:

an engine and an exhaust pipe, wherein said exhaust pipe comprising:

a first inclined portion defined on between one end of said exhaust pipe and a lowest point;

a second inclined portion defined on between said lowest point and the other end of said exhaust pipe;

a first flexible joint disposed in said first inclined portion; and a second flexible joint disposed in said second inclined portion;

wherein said lowest point defined in between both ends of said exhaust pipe is at a position lower than both ends of said exhaust pipes, wherein said exhaust pipes are shaped in a U-shape as a whole.

7. The vehicle according to claim 6, comprising:

a cylinder head disposed on said engine;

a transmission coupled to said engine, said engine and said transmission being transversely mounted at a front portion of said vehicle;

a manifold coupled to a rear side of said cylinder head;

a drive shaft extending transversely from said transmission; and a steering gear box for steering the front wheels, wherein said first inclined portion is extending from said exhaust manifold toward the rear in a downward direction, said drive shaft is disposed in front of said first inclined portion and said steering gear box is disposed behind said first inclined portion.

8. The vehicle according to claim 7, comprising a pre-catalyzer connected one end of said exhaust pipe, wherein said pre-catalyzer and said steering gear box are offset vertically.

9. The vehicle according to claim 6, wherein a roll center of a power unit, said first flexible joint and said second flexible joint are situated on the same straight line in a neutral state.

* * * * *